US011321644B2

United States Patent
Hicks et al.

(10) Patent No.: US 11,321,644 B2
(45) Date of Patent: May 3, 2022

(54) SOFTWARE DEVELOPER ASSIGNMENT UTILIZING CONTRIBUTION BASED MASTERY METRICS

(71) Applicant: International Business Machines Corporation, Armonk, NY (US)

(72) Inventors: Andrew C. M. Hicks, Wappingers Falls, NY (US); Michael Terrence Cohoon, Fishkill, NY (US); Ryan Thomas Rawlins, New Paltz, NY (US); Michael E. Gildein, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 16/749,015

(22) Filed: Jan. 22, 2020

(65) Prior Publication Data
US 2021/0224717 A1    Jul. 22, 2021

(51) Int. Cl.
*G06Q 10/06* (2012.01)
*G06F 8/71* (2018.01)
*G06Q 10/10* (2012.01)

(52) U.S. Cl.
CPC ....... *G06Q 10/063112* (2013.01); *G06F 8/71* (2013.01); *G06Q 10/063114* (2013.01); *G06Q 10/101* (2013.01)

(58) Field of Classification Search
CPC ............. G06Q 50/205; G06Q 10/0639; G06Q 50/2057; G06Q 10/06398; G06Q 10/06;
(Continued)

(56) References Cited

U.S. PATENT DOCUMENTS 5,111,391 A   5/1992  Fields et al.
6,275,812 B1  8/2001  Haq et al.
(Continued)

FOREIGN PATENT DOCUMENTS

GB        2502181 A    11/2013
KR     101425054 B1    8/2014
(Continued)

OTHER PUBLICATIONS

Wu, Ching-Seh, Software Project Plan Tracking Intelligent Agena Texas A&M University, Dec. 2000 (Year: 2000).*
(Continued)

*Primary Examiner* — Scott L Jarrett
(74) *Attorney, Agent, or Firm* — Cantor Colburn LLP; Teddi Maranzano

(57) ABSTRACT

Techniques for an expertise score vector for software component management are described herein. An aspect includes determining a size and an amount of time corresponding to committed code contributed by a first developer to a first software component. Another aspect includes determining a time per unit of contribution based on the size and amount of time. Another aspect includes updating component mastery metrics corresponding to the first software component in an expertise score vector corresponding to the first developer based on the time per unit of contribution. Another aspect includes assigning the first developer to a developer tier based on the component mastery metrics. Another aspect includes assigning a work item corresponding to the first software component to the first developer based on the developer tier.

14 Claims, 9 Drawing Sheets

(58) Field of Classification Search
CPC ... G06Q 10/063112; G06Q 10/063118; G06Q 10/063114
See application file for complete search history.

(56) References Cited

U.S. PATENT DOCUMENTS

| | | | |
|---|---|---|---|
| 6,381,640 B1 | 4/2002 | Beck et al. | |
| 6,651,244 B1* | 11/2003 | Smith | G06F 8/75 714/38.1 |
| 6,984,177 B2* | 1/2006 | Lydon | G06Q 10/06 463/42 |
| 7,100,195 B1* | 8/2006 | Underwood | G06F 9/451 726/2 |
| 7,212,987 B2* | 5/2007 | Swanke | G06Q 10/06 705/7.15 |
| 7,216,088 B1* | 5/2007 | Chappel | G06Q 10/063118 705/7.17 |
| 7,286,999 B2* | 10/2007 | Majd | G06Q 10/10 705/7.15 |
| 7,506,312 B1 | 3/2009 | Girolami-Rose et al. | |
| 7,644,013 B2 | 1/2010 | Nastacio et al. | |
| 7,962,890 B2* | 6/2011 | Kratschmer | G09B 19/0053 717/102 |
| 8,392,234 B2* | 3/2013 | Ma | G06Q 10/0631 705/7.13 |
| 8,522,240 B1 | 8/2013 | Merwarth et al. | |
| 8,595,685 B2 | 11/2013 | Sharma et al. | |
| 8,600,926 B2 | 12/2013 | Flinn et al. | |
| 8,645,292 B2 | 2/2014 | Flinn et al. | |
| 8,843,882 B1 | 9/2014 | Dejban et al. | |
| 8,856,725 B1* | 10/2014 | Anderson | G06F 8/75 717/103 |
| 9,104,997 B1* | 8/2015 | Balasubramanian | G06Q 50/01 |
| 9,305,279 B1 | 4/2016 | Menzel | |
| 9,489,289 B2 | 11/2016 | Hu et al. | |
| 9,652,224 B2* | 5/2017 | Hey | G06Q 10/063112 |
| 9,785,432 B1 | 10/2017 | Wright | |
| 10,042,636 B1* | 8/2018 | Srivastava | G06Q 10/06 |
| 10,248,416 B2 | 4/2019 | Jha | |
| 10,275,601 B2* | 4/2019 | Smith | G06F 21/577 |
| 10,310,852 B2* | 6/2019 | Strachan | G06F 8/20 |
| 10,310,853 B2* | 6/2019 | Wright | G06F 8/77 |
| 10,310,968 B2* | 6/2019 | Biddle | G06F 11/3616 |
| 10,963,244 B2* | 3/2021 | Mo | G06F 8/75 |
| 2003/0130820 A1 | 7/2003 | Lane | |
| 2003/0130881 A1* | 7/2003 | Calderaro | G06Q 10/10 705/7.14 |
| 2003/0192029 A1* | 10/2003 | Hughes | G06Q 10/06311 717/101 |
| 2003/0229529 A1* | 12/2003 | Mui | G06Q 50/2057 705/328 |
| 2005/0160395 A1* | 7/2005 | Hughes | G06Q 30/0282 717/102 |
| 2005/0223354 A1* | 10/2005 | Drissi | G06F 8/36 717/114 |
| 2006/0106774 A1* | 5/2006 | Cohen | G06Q 30/06 |
| 2006/0107191 A1* | 5/2006 | Hirooka | G06F 11/3616 714/796 |
| 2006/0173732 A1 | 8/2006 | Edwards | |
| 2006/0184928 A1* | 8/2006 | Hughes | G06F 8/65 717/168 |
| 2007/0168946 A1* | 7/2007 | Drissi | G06F 8/71 717/110 |
| 2007/0220479 A1* | 9/2007 | Hughes | G06Q 30/02 717/100 |
| 2007/0250816 A1* | 10/2007 | Rose | G06Q 10/06 717/124 |
| 2008/0046860 A1* | 2/2008 | Kratschmer | G06F 11/008 717/101 |
| 2008/0196000 A1* | 8/2008 | Fernandez-Lvern | G06F 8/20 717/101 |
| 2009/0070734 A1* | 3/2009 | Dixon | G06F 8/71 717/102 |
| 2009/0150344 A1* | 6/2009 | Herness | G06Q 10/06 |
| 2009/0182757 A1* | 7/2009 | Lotlikar | G06Q 30/02 |
| 2009/0182758 A1* | 7/2009 | Lotlikar | G06F 16/24578 |
| 2010/0211957 A1* | 8/2010 | Lotlikar | G06F 9/5027 718/104 |
| 2010/0257015 A1 | 10/2010 | Molander | |
| 2011/0055799 A1* | 3/2011 | Kaulgud | G06F 11/3616 717/101 |
| 2011/0252394 A1* | 10/2011 | Sharma | G06F 11/3616 717/101 |
| 2012/0077174 A1 | 3/2012 | Depaul | |
| 2012/0150859 A1 | 6/2012 | Hu | |
| 2013/0226656 A1 | 8/2013 | Sedotajr et al. | |
| 2013/0232471 A1* | 9/2013 | Henties | G06F 8/45 717/124 |
| 2013/0254329 A1 | 9/2013 | Lin et al. | |
| 2013/0290207 A1 | 10/2013 | Bonmassar | |
| 2014/0137074 A1* | 5/2014 | Hey | G06Q 10/063112 717/101 |
| 2014/0165027 A1* | 6/2014 | Herbert | G06Q 10/063112 717/101 |
| 2014/0344776 A1* | 11/2014 | Dunne | G06F 8/70 717/101 |
| 2015/0081363 A1* | 3/2015 | Taylor | G06Q 10/063112 705/7.14 |
| 2015/0154529 A1 | 6/2015 | Raajaratnam et al. | |
| 2015/0235282 A1* | 8/2015 | Kamath | G06Q 30/0283 717/102 |
| 2015/0339613 A1* | 11/2015 | Mendis | G06Q 10/06393 717/102 |
| 2016/0034839 A1 | 2/2016 | Aggarwal et al. | |
| 2016/0140478 A1 | 5/2016 | Hambrick et al. | |
| 2016/0162392 A1 | 6/2016 | Hu et al. | |
| 2016/0364651 A1 | 12/2016 | Flinn et al. | |
| 2017/0060578 A1* | 3/2017 | Shukla | G06Q 10/06398 |
| 2017/0091078 A1 | 3/2017 | Atyam et al. | |
| 2017/0330090 A1* | 11/2017 | Jayaraman | G06Q 10/0637 |
| 2017/0344927 A1* | 11/2017 | Coletta | G06Q 10/063118 |
| 2017/0372249 A1* | 12/2017 | Abraham | G06Q 10/06393 |
| 2018/0068271 A1* | 3/2018 | Abebe | G06Q 10/103 |
| 2018/0082242 A1* | 3/2018 | Strange | G06Q 10/06315 |
| 2018/0129483 A1 | 5/2018 | Biddle et al. | |
| 2018/0129497 A1* | 5/2018 | Biddle | G06F 11/3636 |
| 2018/0150739 A1* | 5/2018 | Wu | G06N 3/006 |
| 2018/0150786 A1* | 5/2018 | Debnath | G06Q 10/063114 |
| 2018/0275989 A1* | 9/2018 | Kakkad | G06F 11/3409 |
| 2018/0285103 A1 | 10/2018 | Jha | |
| 2018/0349135 A1* | 12/2018 | Burns | G06F 8/70 |
| 2019/0129714 A1* | 5/2019 | Wright | G06F 8/75 |
| 2019/0205127 A1* | 7/2019 | Mo | G06F 8/71 |
| 2019/0258985 A1* | 8/2019 | Guastella | G06N 20/00 |
| 2019/0287040 A1* | 9/2019 | Cohen | G06Q 10/06398 |
| 2019/0361791 A1 | 11/2019 | Sloyan et al. | |
| 2020/0026589 A1* | 1/2020 | Ghosh | G06F 11/3447 |
| 2020/0142818 A1 | 5/2020 | Holla et al. | |
| 2020/0167156 A1* | 5/2020 | Szczepanik | G06F 16/9535 |
| 2021/0110330 A1* | 4/2021 | Li | G06Q 10/063112 |

FOREIGN PATENT DOCUMENTS

WO 2014201171 A2 12/2014
WO 201908600 A1 1/2019

OTHER PUBLICATIONS

Nystedt, Sofia et al., Software Complexity and Project Performance University of Gothenburg, Spring 1999 (Year: 1999).*
Sidler, Robert, Software Productivity Fall, 2002 (Year: 2002).*
Simmons, Dick B. et al., Software Measurement a Visualization Toolkit Hewlett-Packard Professional Series, Prentice Hall PTR, 1998 (Year: 1998).*
Bhat et al., "An Expert Recommendation System for Design Decision Making: Who Should be Involved in Making a Design Decision?", 2018 IEEE Int'l Conf on Software Architecture [online], 2018 [retrieved Apr. 31, 2020], Retrieved from nternet: <URL: https://ieeexplore.ieee.org/abstract/document/8417121>, pp. 85-94.

(56) References Cited

OTHER PUBLICATIONS

Anonymous, "System and Method to Estimate Software's Client Experience (Client Experience Predictor)," ip.com Nov. 24, 2014. 7 Pages.
Anonymous., "Methods for Calculating Combined Software Complexity Indicators." Jan. 28, 2013. 6 Pages.
Carrillo, RR. et al. "A Metric for Evaluating Neural Input Representation in Supervised Learning Networks," Google Dec. 2018. 15 pages.
Hicks et al., "Expertise Score Vector Based Work Item Assignment for Software Component Management," U.S. Appl. No. 16/749,014, filed Jan. 22, 2020.
Hicks et al., "Expertise Score Vector for Software Component Management," U.S. Appl. No. 16/749,017, filed Jan. 22, 2020.
Hicks et al., "Problem Record Management Using Expertise Score Vector," U.S. Appl. No. 16/749,019, filed Jan. 22, 2020.
IBM "List of IBM Patents or Patent Applications Treated as Related; (Appendix P)", Filed Jan. 23, 2020, 2 pages.
Petreczky, M. et al., "Metrics and Topology for Nonlinear and Hybrid Systems." Google. 2017. 14 Pages.
Sperry, "Patent Quality Chat: How is a USPTO Examiner's Work Product Reviewed?", Dec. 4, 2017, 2 pages, https://www.mintz.com/insights-center/viewpoints/2017-12-04-patent-quality-chat-how-uspto-examiners-work-product-reviewed.

\* cited by examiner

SOFTWARE DEVELOPER ASSIGNMENT UTILIZING CONTRIBUTION BASED MASTERY METRICS

BACKGROUND

The present invention generally relates to computer systems, and more specifically, to an expertise score vector for software component management in a computer system.

Computer systems control almost every aspect of our life—from writing documents to controlling traffic lights. Such computer systems are controlled by software components that may be written by teams of software developers. The software components may be relatively complex, requiring relatively large numbers of developers working together to produce and maintain computer code that is executed on a computer system. Further, computer systems may be often error-prone, and thus require a testing phase in which any errors should be discovered. The testing phase is considered one of the most difficult tasks in designing a computer system. The cost of not discovering an error may be enormous, as the consequences of the error may be disastrous.

SUMMARY

Embodiments of the present invention are directed to an expertise score vector for software component management. A non-limiting example computer-implemented method includes determining a size and an amount of time corresponding to committed code contributed by a first developer to a first software component. The method also includes determining a time per unit of contribution based on the size and amount of time. The method also includes updating component mastery metrics corresponding to the first software component in an expertise score vector corresponding to the first developer based on the time per unit of contribution. The method also includes assigning the first developer to a developer tier based on the component mastery metrics. The method also includes assigning a work item corresponding to the first software component to the first developer based on the developer tier.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
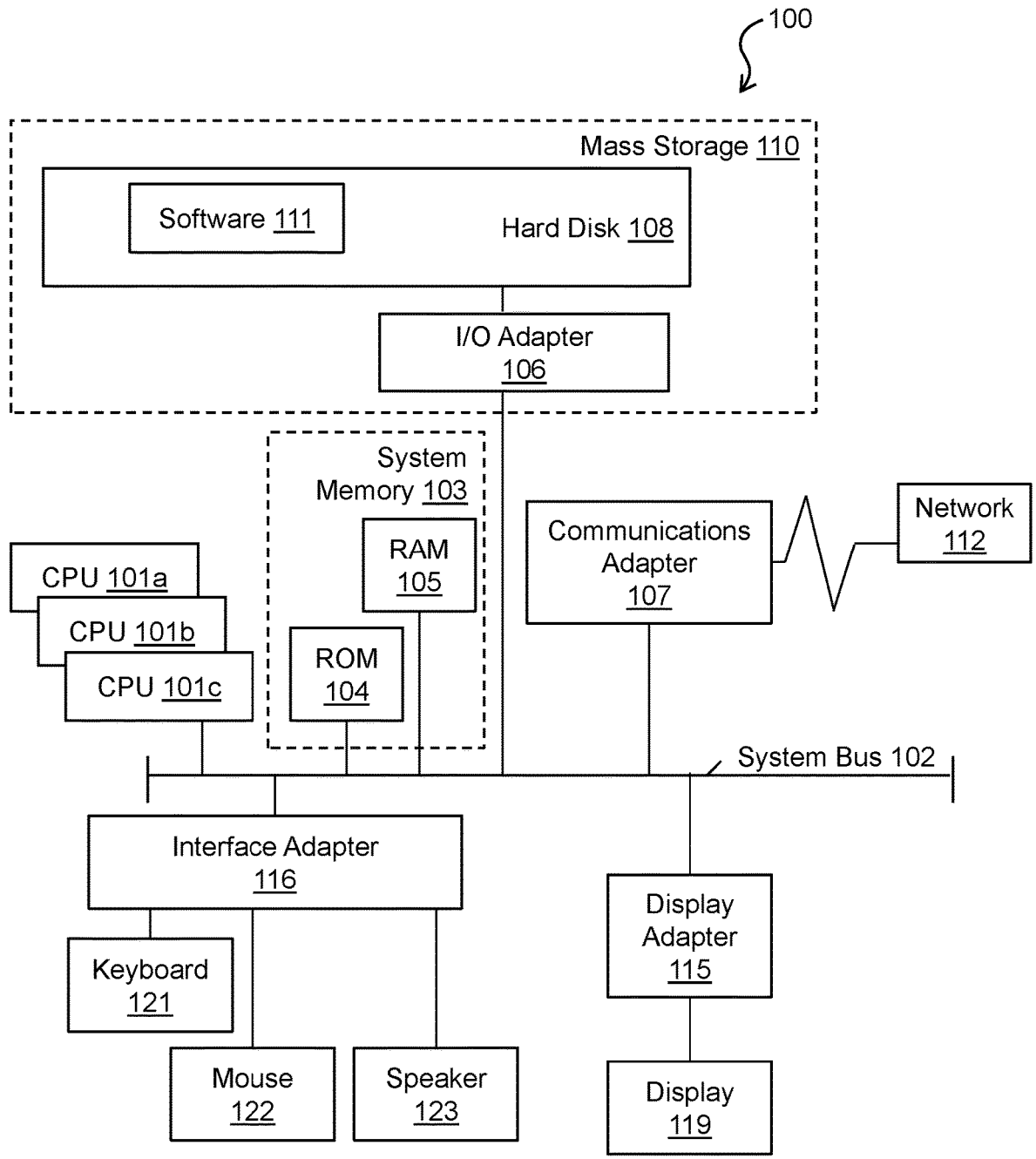
FIG. 1 is a block diagram of an example computer system for use in conjunction with one or more embodiments of an expertise score vector for software component management.

One or more embodiments of the present invention provide an expertise score vector for software component management. An organization may produce and maintain computer software products for use on computer systems that include multiple software components. Each software component may be assigned a team of developers that are responsible for the software component. Creating software (i.e., developing) for different computer systems that implement relatively complex software components may require specialized knowledge and skills by a software developer. Such knowledge and skills may be gained through experience developing for a particular computer system and/or software component. In order to maintain relatively high quality in software that is produced by an organization, respective expertise score vectors may be maintained for each developer in an organization to identify levels of skills and component mastery for individual developers. Work items may be assigned to developers based on expertise scores that are determined based on the expertise score vectors. For example, a more experienced developer having a higher expertise score may be assigned relatively complex work items, while a less experienced developer having a lower expertise score may be assigned relatively simple work items.

An expertise score vector may include any appropriate metrics, including but not limited to a number of defects detected per unit of contribution to a software component, an amount of time used by the developer per unit of contribution to a software component, and a skillset of the developer. A developer's design iterations over time for a given software component may be quantified in the expertise score vector. For each design iteration, the contribution size and the time spent in development may be determined. A time per unit of contribution (e.g., a number of lines of code) may be calculated based on the contribution size and the time spent in development. The time per unit of contribution may be used to determine an overall component mastery metric corresponding to the given software component for the developer. A higher time per unit of contribution may indicate a newer developer, while a lower time per unit of contribution may indicate a masterful developer. Thresholds may be set to separate a group of developers into tiers (e.g., beginner, intermediate, and/or advanced) based on the time per unit of contribution and/or the overall component mastery metric. In some embodiments, the overall component mastery metric may be inversely related to the time per unit of contribution. The thresholds may each have any appropriate value, and may be calculated based on any appropriate data trends or statistics (e.g., standard deviation) regarding a development team in some embodiments.

The average time per unit of contribution for an entire team may be calculated and compared to an average time per unit of contribution for other teams in an organization. The average time per unit of contribution for a particular software component may be used to determine a relative complexity of the software component. For example, a relatively low average time per unit of contribution may indicate a less complex software component, while a relatively high average time per unit of contribution may indicate a more complex software component.

A developer's component mastery metrics may be stored and analyzed over time. An amount of time required (i.e., an onboarding time) for an inexperienced developer to contribute to a particular software component (e.g., achieve an intermediate developer tier) may be compared to an amount of time required for an experienced developer that was previously working on a different software component to contribute to the particular software component. Comparison of the onboarding times may be used to quantify how easily skills learned while developing for other software components transfer to a particular software component, and may be used to determine an onboarding score for the particular software component. For example, if the onboarding times of the inexperienced developer and the experienced developer are similar for the particular software component, then it may be determined that skills from other software components may not be easily transferrable to the particular software component. If the experienced developer has a relatively low onboarding time for the particular software component as compared to the inexperienced developer, then it may be determined that skills from other software components may be easily transferrable to the particular software component. If the experienced developer has a relatively high onboarding time for the particular software component as compared to the inexperienced developer, then it may be determined that skills from other software components may negatively impact mastery of the particular software component.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
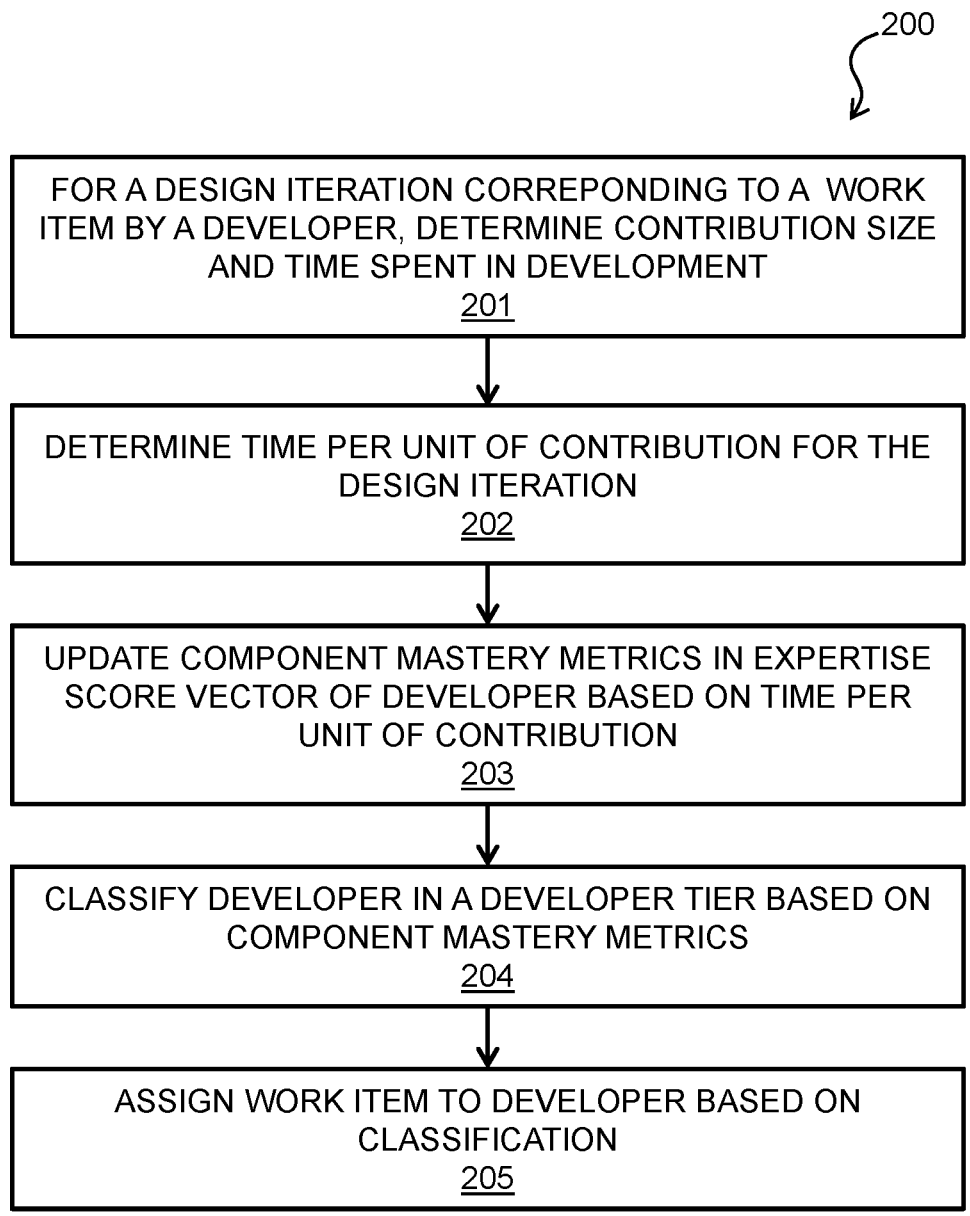
FIG. 2 is a flow diagram of a process for an expertise score vector for software component management in accordance with one or more embodiments of the present invention.

Turning now to FIG. 2, a process flow diagram of a method 200 for an expertise score vector for software component management is generally shown in accordance with one or more embodiments of the present invention. Method 200 may be implemented in conjunction with any appropriate computer system, such as computer system 100 of FIG. 1. In block 201 of method 200, for a design iteration corresponding to a work item that is assigned to a developer, a contribution size and an amount of time spent in development for the contribution are determined. The contribution size may be determined in any appropriate manner, for example, the number of lines of code, or based on a task size of the work item. The work item may correspond to a particular software component. In block 202, a time per unit of contribution corresponding to the work item is determined for the developer based on the contribution size and amount of time spent in development that were determined in block 201.

In block 203, component mastery metrics corresponding to the particular software component in an expertise score vector of the developer is updated based on the time per unit of contribution that was determined in block 202. A relatively high time per unit of contribution may indicate a lower level of mastery of the software component by the developer, while a relatively low time per unit of contribution may indicate a higher level of mastery of the software component by the developer. Embodiments of an expertise score vector including component mastery metrics, such as is updated in block 203, are illustrated with respect to FIG. 4B, which is discussed in further detail below.

Flow of method 200 then proceeds to block 204. In block 204, the developer is classified based on the component mastery metrics in the expertise score vector that was updated in block 203. For example, the developer may be determined to be in a developer tier (e.g., beginner, intermediate, or advanced) for the particular software component based on the developer's component mastery metrics corresponding to the particular software component. Thresholds may be set to separate a group of developers into tiers (e.g., beginner, intermediate, and/or advanced). The thresholds may each have any appropriate value, and may be calculated based on data trends or statistics (e.g., standard deviation) regarding a development team in some embodiments. In some embodiments, the component mastery metrics that are used to make the classification of block 204 may include the time per unit of contribution, a number of defects detected in committed code per unit of contribution, an amount of time spent on the software component, and/or a total number of contributions made to the software component. In some embodiments, an overall component mastery metric may be used for the classification of block 204 that includes any combination of the component mastery metrics.

In block 205, a new work item corresponding to the particular software component is assigned to the developer based on the classification that was determined in block 204. For example, a relatively complex work item may be assigned to the developer based on the developer having been determined to be in an advanced developer tier, while a relatively simple work item may be assigned to the developer based on the developer having been determined to be in a beginner developer tier. The work item assignment of block 205 may further take into account the developer's current workload, which may be quantified by a work queue points value that is tracked for the developer by a work item management module. After completion of the new work item that was assigned to the developer in block 205, method 200 may be repeated for the new work item to update the developer's expertise score vector based on the new work item. Embodiments of method 200 may be implemented in software component management system 400 of FIG. 4A, which is discussed in further detail below.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
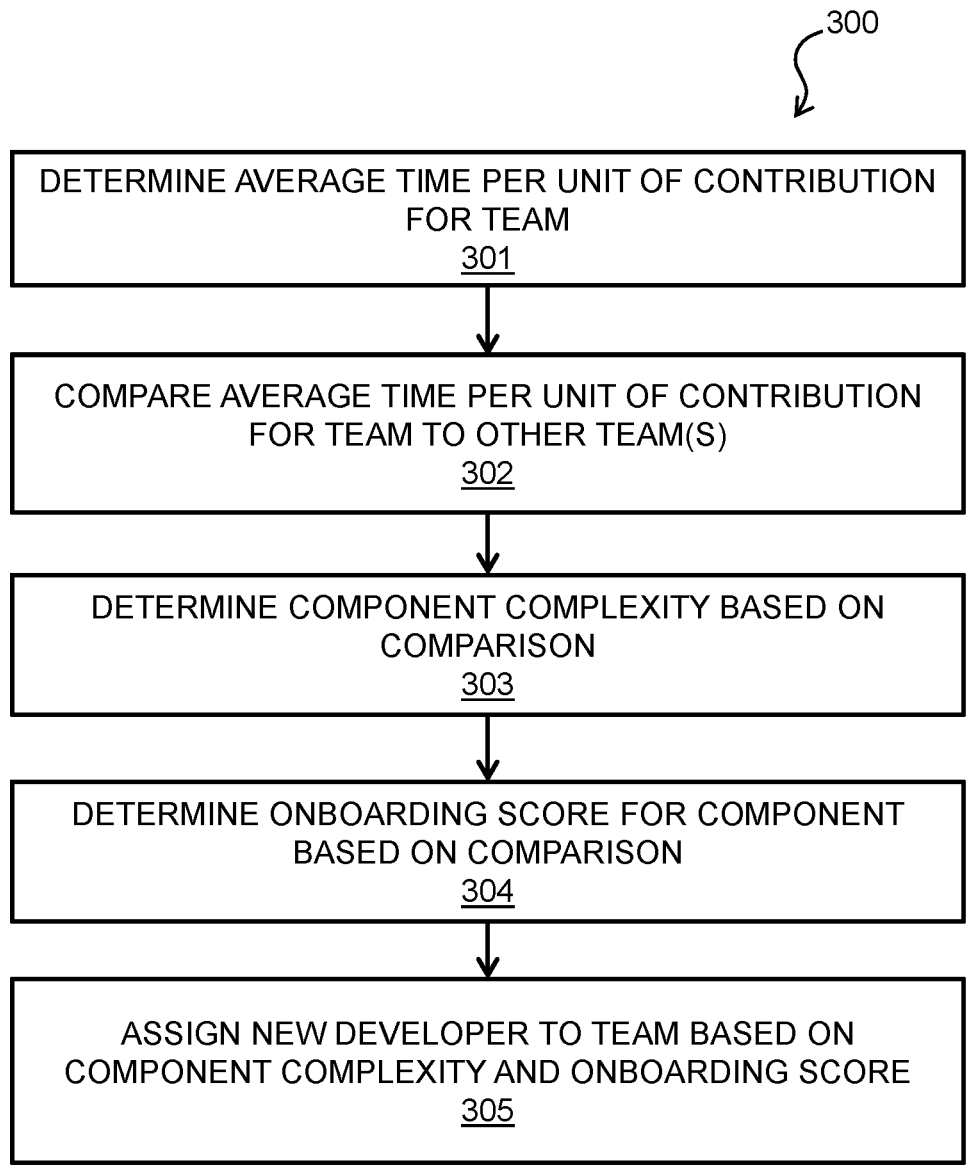
FIG. 3 is a flow diagram of a process for component complexity and onboarding score determination using an expertise score vector for software component management in accordance with one or more embodiments of the present invention.

FIG. 3 shows a process flow diagram of a method 300 for component complexity and onboarding score determination using an expertise score vector for software component management in accordance with one or more embodiments of the present invention. Method 300 may be implemented in conjunction with any appropriate computer system, such as computer system 100 of FIG. 1. In block 301, an average time per unit of contribution across developers on a team is determined. The team may correspond to a particular software component. An expertise score vector is maintained for each developer on the team according to method 200 of FIG. 2, including a time per unit of contribution and an overall component mastery metric corresponding to the single software component. Each developer's time per unit of contribution may be extracted and averaged in block 301 to determine the team's average time per unit of contribution. In block 302, the average time per unit of contribution for the team that was determined in block 301 is compared to one or more average time(s) per unit of contribution corresponding to one or more other teams that are assigned to different software components that are maintained by an organization.

In block 303, a component complexity for the particular software component is determined based on the comparison of block 302. For example, if the team assigned to the particular software component has a relatively high time per unit of contribution as compared to other teams, it may be determined that the particular software component is more complex than the other software components, while if the team assigned to the particular software component has a relatively low time per unit of contribution as compared to other teams, it may be determined that the particular software component is less complex than the other software components. In block 304, an onboarding score is determined for the team based on the component complexity that was determined in block 303. The onboarding score quantifies an average amount of time required for a developer to start contributing at a reasonable level (e.g., achieve an intermediate developer tier) to the particular software component. Examples of graphs illustrating various embodiments of onboarding time comparisons, which may be used to determine onboarding scores, are discussed below in further detail with respect to FIGS. 5A-D. In block 305, a new developer may be assigned to the team corresponding to the particular software component based on the component complexity and onboarding score that were determined in blocks 303 and 304. For example, for a team that owns a software component that was determined to have a relatively high complexity and/or a higher onboarding score in blocks 303 and 304, a more experienced new developer may be assigned to the team. For a team that owns a software component that was determined to have a relatively low complexity and/or a lower onboarding score in blocks 303 and 304, a relatively inexperienced new developer may be assigned to the team.

Further, for any new developer that is added to a team in block 305, an estimate of an amount of time required for the new developer to achieve an intermediate or advanced developer tier may be determined based on the developer's expertise score vector, the component complexity, and the onboarding score of the software component owned by the team. A new developer may also be evaluated based on how long it actually takes the developer to achieve an intermediate or advanced tier for a software component, as compared to the estimate.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4A:
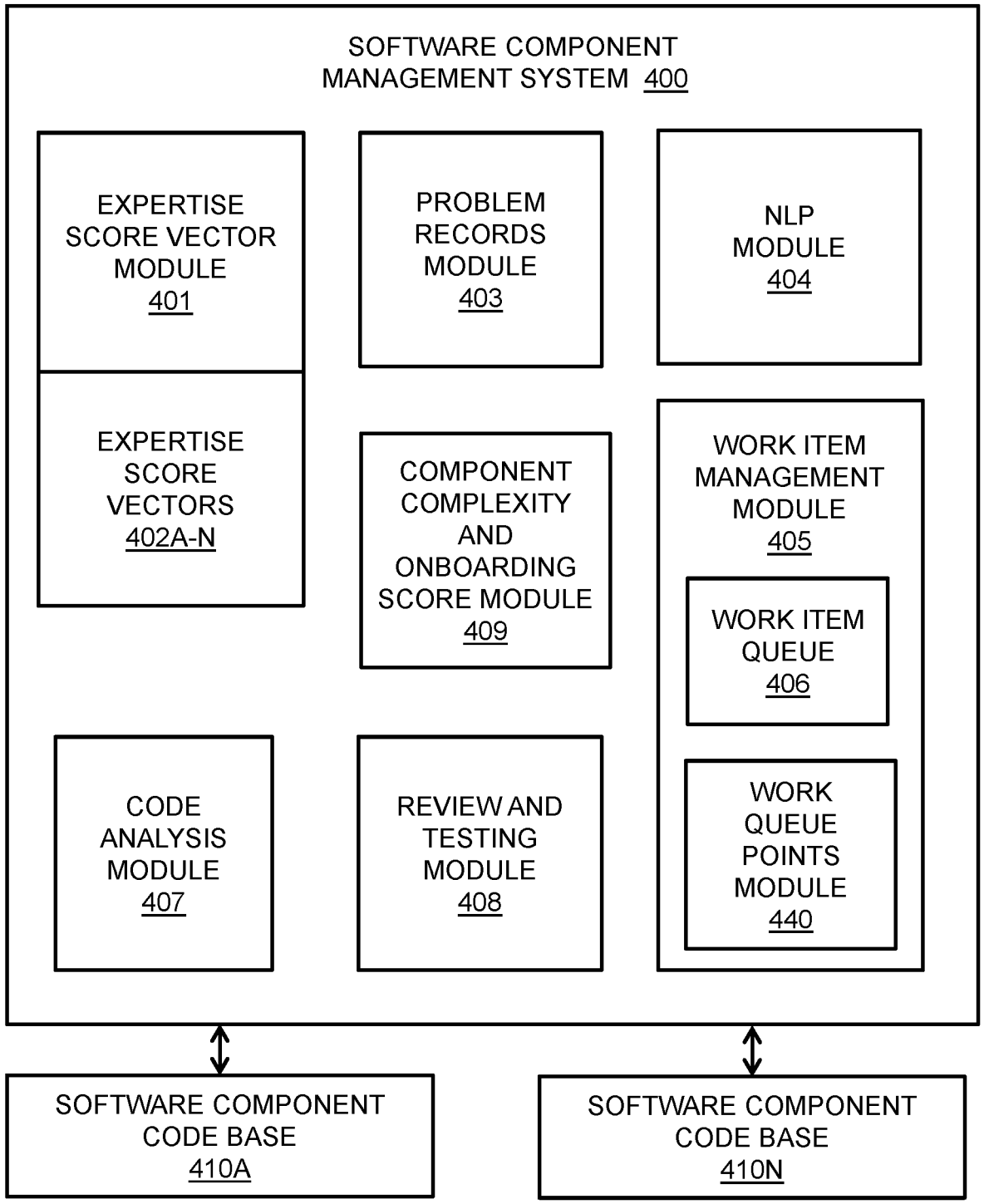
FIGS. 4A and 4B are a block diagram of components of a system for an expertise score vector for software component management in accordance with one or more embodiments of the present invention.

Turning now to FIG. 4A, a software component management system 400 that includes an expertise score vector is generally shown in accordance with one or more embodiments of the present invention. Software component management system 400 may be implemented in conjunction with any appropriate computer system(s), including but not limited to computer system 100 of FIG. 1. Software component management system 400 is in communication with software component code bases 410A-N, which each include computer code written by one or more developers on teams corresponding to respective software components. The software component management system 400 includes an expertise score vector module 401, which may maintain a respective expertise score vector of expertise score vectors 402A-N for each developer across various teams in the organization. Expertise score vector module 401 and expertise score vectors 402A-N are discussed in further detail below with respect to FIG. 4B.

Software component management system 400 includes a problem records module 403, which receives and manages problem records (e.g., bug reports) regarding the software component code bases 410A-N. Natural language processing (NLP) module 404 performs analysis of problem records that are received by problem records module 403 and may, for example, output keywords that are identified in a problem record to work item management module 405. Work item management module 405 creates work items based on problem records that are received by problem records module 403. The work items may be created by work item management module 405 based on keywords that were identified by NLP module 404 in some embodiments. Work item management module 405 may also create work items based on new feature requests for the software components corresponding to software component code bases 410A-N. Created work items are placed in a work item queue 406 by work item management module 405. The work items in work item queue 406 are assigned to developers by work item management module 405 based on input from expertise score vector module 401 and data from the developers' respective expertise score vectors 402A-N. Work queue points module 440 may track a respective workload for each developer that is currently assigned to any work items in work item queue 406.

When new code is committed by a developer into any of software component code bases 410A-N, code analysis module 407 may review the new code to determine a code quality of the new code. Review and testing module 408 may determine and apply a review and testing process to new code, and may also assign one or more developers to the review and testing process based on expertise score vectors 402A-N. Review and testing module 408 may also provide data regarding the review and testing of code to expertise score vector module 401.

Component complexity and onboarding score module 409 may determine a relative component complexity and an onboarding score for each software component corresponding to software component code bases 410A-N. Component complexity and onboarding score module 409 may implement method 300 of FIG. 3, based on component mastery metrics 431A-N and developer classification module 422 of FIG. 4B, which are discussed below. Component complexity and onboarding score module 409 is discussed in further detail below with respect to FIGS. 5A-D.

It is to be understood that the block diagram of FIG. 4A is not intended to indicate that the system 400 is to include all of the components shown in FIG. 4A. Rather, the system 400 can include any appropriate fewer or additional components not illustrated in FIG. 4A (e.g., additional memory components, embedded controllers, functional blocks, connections between functional blocks, modules, inputs, outputs, etc.). Further, the embodiments described herein with respect to system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4B:
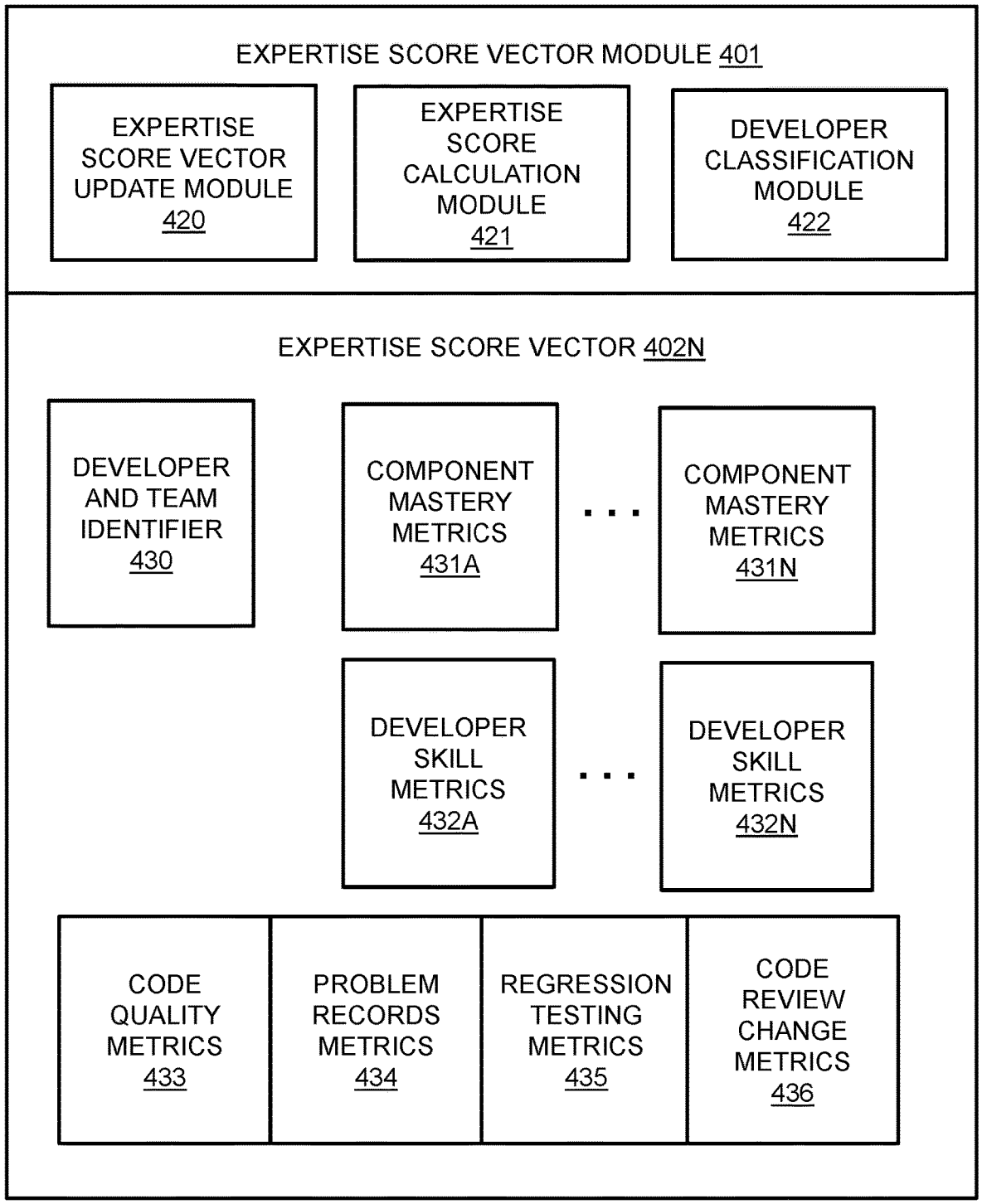

Turning now to FIG. 4B, an expertise score vector module 401 is generally shown in accordance with one or more embodiments of the present invention. Expertise score vector module 401 of FIG. 4B corresponds to expertise score vector module 401 of FIG. 4A, and manages a plurality of expertise score vectors 402A-N. Expertise score vector module 401 includes an expertise score vector update module 420, which may update any field in an expertise score vector 402N based on data from problem records module 403, work item management module 405, code analysis module 407, and review and testing module 408 in software component management system 400.

Expertise score calculation module 421 may determine an expertise score for a developer based on the developer's expertise score vector 402N. An expertise score may be determined based on any appropriate subset of the fields in expertise score vector 402N, and the various fields in expertise score vector 402N may each be given any appropriate weight in calculating an expertise score. An expertise score may be calculated by expertise score calculation module 421 for a specific skill in some embodiments, such that only fields related to the specific skill are used to calculate the expertise score for the specific skill. In some embodiments, an expertise score that is calculated for a specific skill or software component may be used to assign work items to developers by work item management module 405, as described with respect to block 205 of method 200 of Fig. Developer classification module 422 may determine a classification for a developer based on a set of component mastery metrics 431A of component mastery metrics 431A-N, as described above with respect to block 204 of method 200 of FIG. 2.

Expertise score vector 402N corresponds to a single developer in an organization. Expertise score vector 402N includes a developer and team identifier 430, which includes a unique identifier of the developer corresponding to expertise score vector 402N, and any teams that the developer is part of. A developer may be part of multiple teams in some embodiments. Expertise score vector 402N includes a plurality of data fields corresponding to the developer.

Expertise score vector 402N may include respective component mastery metrics 431A-N for each software component that the developer has contributed work to. Each set of component mastery metrics of component mastery metrics 431A-N may be determined as described above with respect to blocks 201, 202, and 203 of method 200 of FIG. 2. Component mastery metrics 431A-N may include an amount of time required by the developer to produce a unit of contribution to the associated software component. The unit of contribution may be measured in any appropriate manner (e.g. task completed, or lines of code). A number of errors or defects found in committed code by, for example, code analysis module 407 and/or review and testing module 408, that is related to a specific software component may also be tracked in component mastery metrics 431A-N. For example, a number of defects detected in code per unit of contribution (e.g., lines of code or number of tasks) for a specific software component may be stored in component mastery metrics 431A-N. The component mastery metrics 431A-N may also include an amount of time spent on the software component, and a total number of contributions made to the software component. Developer classification module 422 may classify the developer with respect to a specific software component based on a corresponding set of component mastery metrics 431A, or an overall component mastery metric corresponding to the specific software component, as described above with respect to block 204 of method 200 of FIG. 2. Work items may be assigned to the developer based on the classifications determined by developer classification module 422, and also based on work queue points module 440, as described above with respect to block 205 of method 200 of FIG. 2.

Expertise score vector 402N may include a plurality of developer skill metrics 432A-N. Each individual set of developer skill metrics 432A-N may correspond to a specific skill (e.g., a programming language, a programming technique, such as recursion or multithreading, or a specific hardware element) possessed by the developer. Any appropriate metrics, including skill level and time spent on the skill, may be maintained in the developer skill metrics, such as developer skill metrics 432A, corresponding to a specific skill. Developer skill metrics 432A-N may be used by expertise score calculation module 421 to determine an expertise score for a specific skill. The developer skill metrics 432A-N may include any appropriate metrics, including but not limited to a language set (e.g., Java, Python, C, etc.), coding techniques, and code patterns. Developer skill metrics 432A-N may track any appropriate particular techniques or technologies, including but not limited to recursion, loops, thread management, mutex locks, and interfacing with specific subcomponents. The developer skill metrics 432A-N may track a number of commits by the developer per skill to quantify an amount of experience the developer has regarding the skill. A number of errors or defects found in committed code by, for example, code analysis module 407 and/or review and testing module 408, that are related to the skill may also be tracked. For example, a number of defects detected in code per unit of contribution (e.g., lines of code or number of tasks) for a specific skill may be stored in developer skill metrics 432A-N. A code contribution by the developer may be scanned by code analysis module 407 (using, for example, static code analysis and/or NLP) to identify what the code does and any techniques that are implemented in the code contribution, and the developer skill metrics 432A-N may be updated based on the scanning. Expertise score vector 402N may also include code quality metrics 433, problem records metrics 434, regression testing metrics 435, and code review change metrics 436.

It is to be understood that the block diagram of FIG. 4B is not intended to indicate that the expertise score vector module 401 is to include all of the components shown in FIG. 4B. Rather, the expertise score vector module 401 can include any appropriate fewer or additional components not illustrated in FIG. 4B (e.g., additional memory components, embedded controllers, functional blocks, connections between functional blocks, modules, inputs, outputs, etc.). Further, the embodiments described herein with respect to expertise score vector module 401 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments. Further, expertise score vector 402N is shown for illustrative purposes only. Embodiments of an expertise score vector such as expertise score vector 402N may include any appropriate number and type of data fields in various embodiments.

Figure 5A:
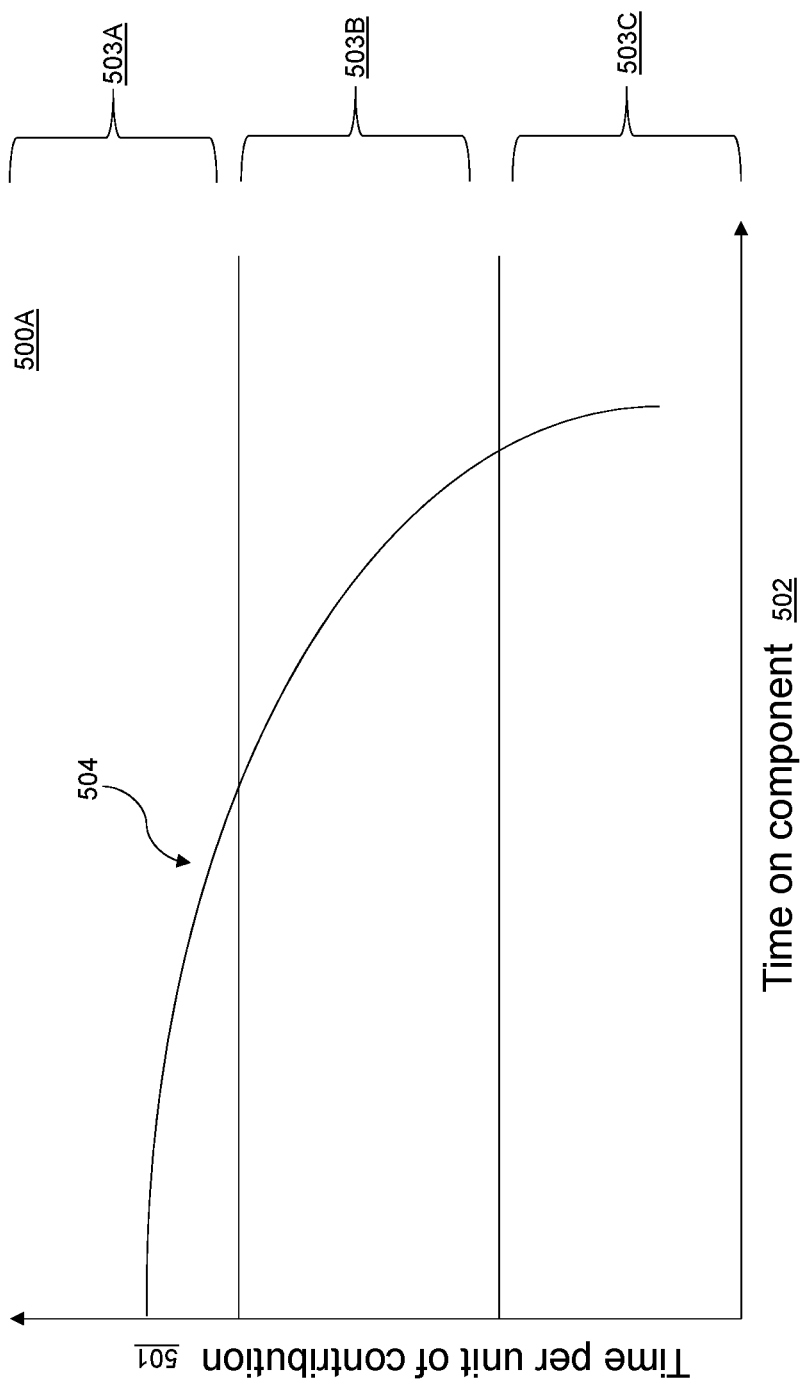
FIGS. 5A, 5B, 5C and 5D are graphs illustrating application of an expertise score vector for software component management in accordance with one or more embodiments of the present invention.

FIGS. 5A-D are graphs 500A-D illustrating application of an expertise score vector for software component management in accordance with one or more embodiments of the present invention. Graph 500A of FIG. 5A illustrates shows a relationship between time per unit of contribution 501 and time spent working on a software component 502. The time per unit of contribution 504 may be tracked for a particular developer in component mastery metrics 431A of FIG. 4B. The time per unit of contribution 504 corresponds to a particular developer working on a particular software component. As shown in FIG. 5A, the time per unit of contribution 504 decreases over time, as the developer gains experience and expertise in the particular software component corresponding to graph 500A. A higher time per unit of contribution 504 may indicate a less skilled developer, while a lower time per unit of contribution 504 may indicate a more masterful developer. Developer tiers 503A-C may be set in developer classification module 422 to classify the developer based on time per unit of contribution 504. For example, tier 503A may correspond to a beginner developer, tier 503B may correspond to an intermediate developer, and tier 503C may correspond to an advanced developer. The thresholds that separate tiers 503A-C may each have any appropriate value. In some embodiments, the thresholds may be calculated based on data trends or statistics (e.g., standard deviation) regarding a development team. As shown in FIG. 5A, the developer corresponding to time per unit of contribution 504 starts in beginner tier 503A, proceeds through intermediate tier 503B, and achieves advanced tier 503C as time spent on working on the software component 502 increases.

Figure 5B:
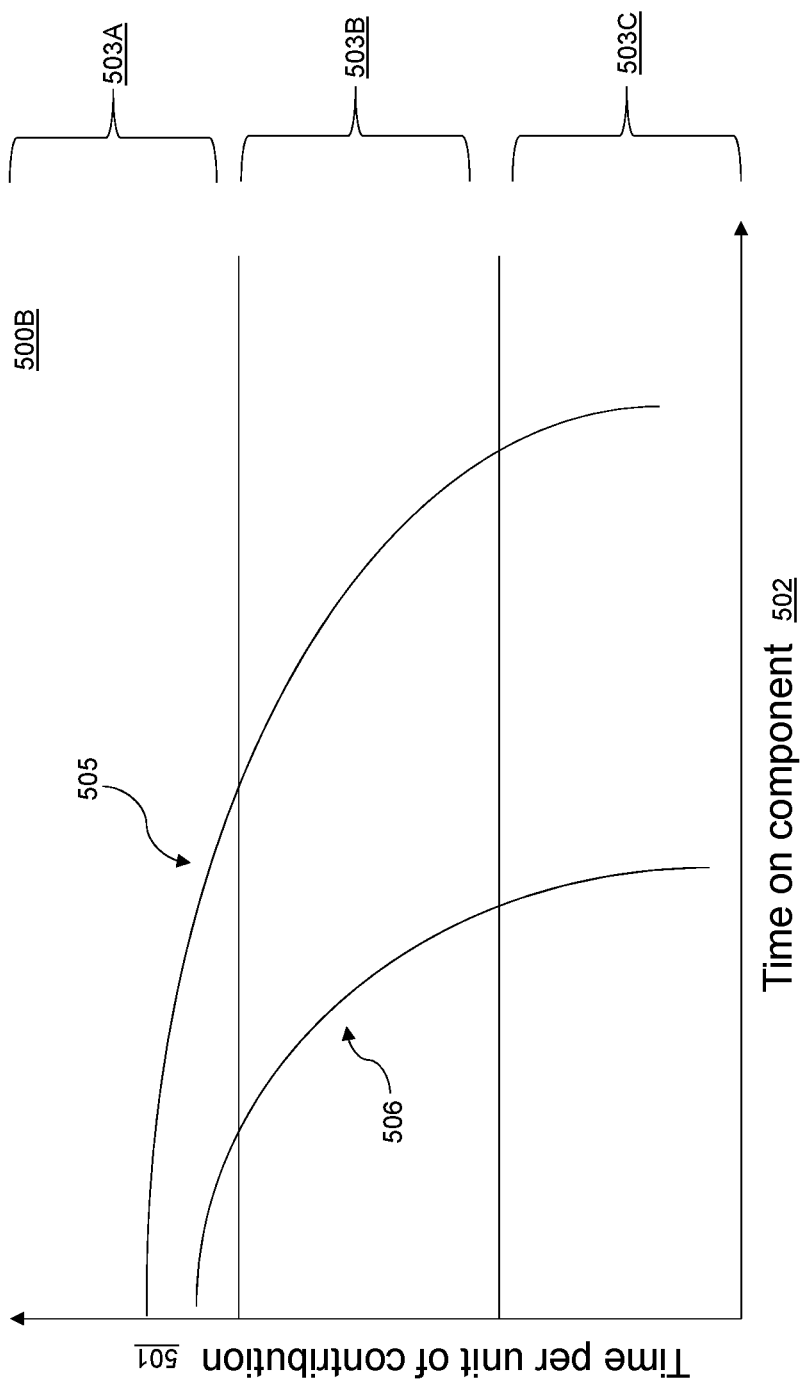
Figure 5C:
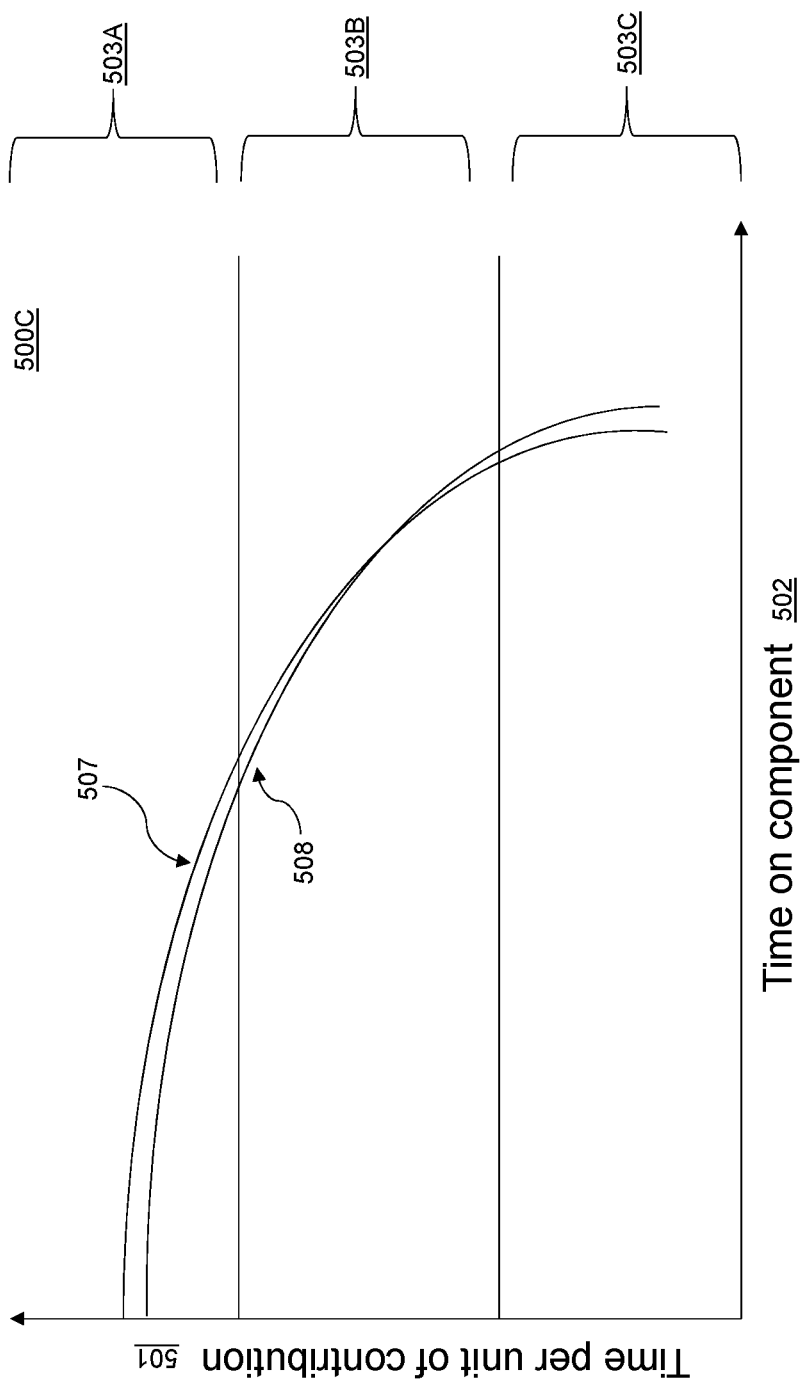
Figure 5D:
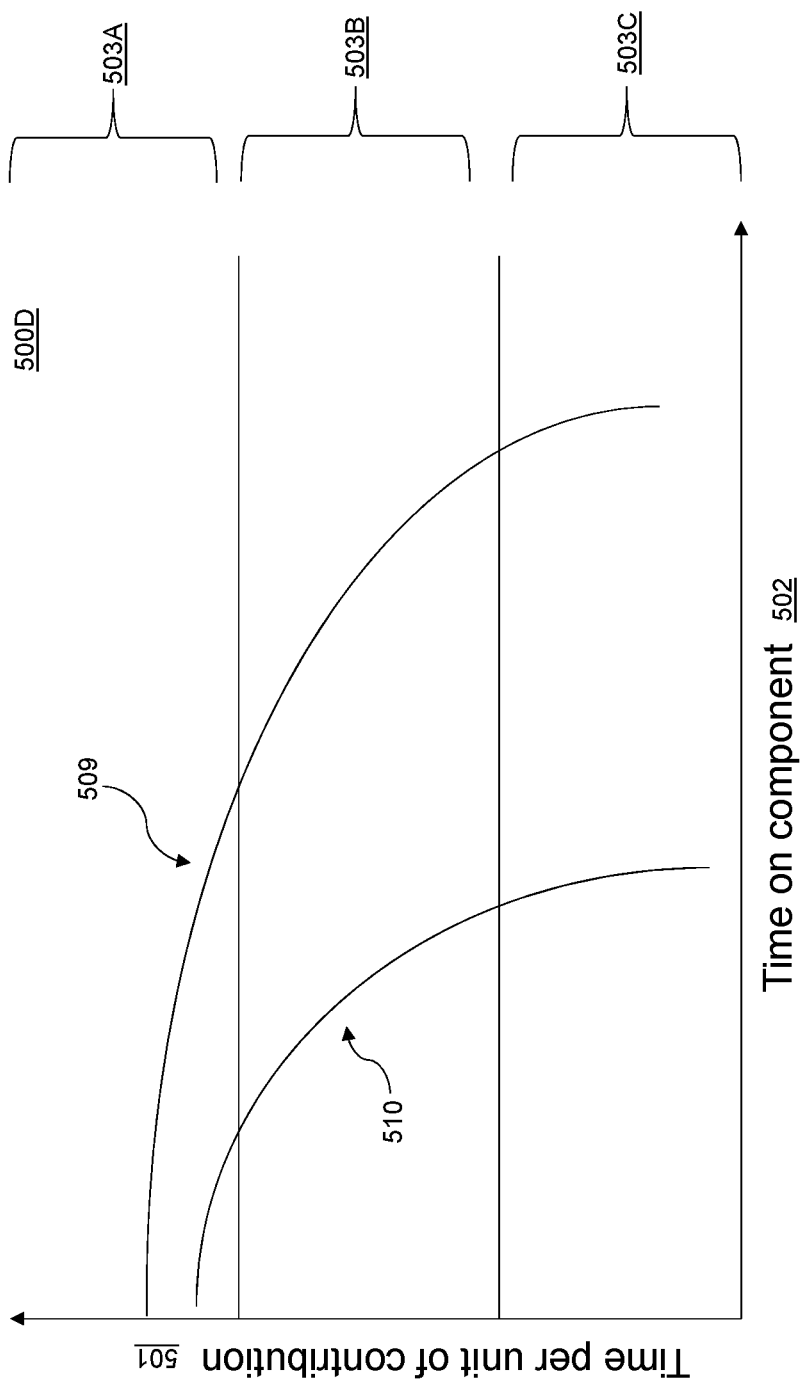

Comparison of onboarding times between experienced and inexperienced developers that are assigned to a particular software component may be used to quantify how easily skills learned while developing for other software components transfer to the particular software component, and may be used to determine an onboarding score for the particular software component. Graph 500B of FIG. 5B illustrates comparison of a first developer's time per unit of contribution 505 to a second developer's time per unit of contribution 506 over time for a first software component. Time per unit of contribution 505 may correspond to an inexperienced developer that is working on the first software component, and time per unit of contribution 506 may correspond to an experienced developer that was transferred to the first software component after previously working on a different software component. The amount of time required (e.g., an onboarding time) for the inexperienced developer to become an intermediate or advanced tier developer for the first software component, as illustrated by time per unit of contribution 505, may be compared to the amount of time required for the experienced developer to become an intermediate or advanced developer for the first software component, as illustrated by time per unit of contribution 506. As shown in FIG. 5B, the experienced developer achieves the intermediate tier 503B and advanced tier 503C more quickly than the inexperienced developer. Therefore, based on determining that the experienced developer has a relatively low onboarding time for the first software component as compared to the inexperienced developer, as shown in graph 500B of FIG. 5B, it may be determined that skills from other software components may be easily transferrable to the first software component. Graph 500C of FIG. 5C illustrates comparison of a time per unit of contribution 507 corresponding to an inexperienced developer to a time per unit of contribution 508 corresponding to an experienced developer for a second software component. As shown in FIG. 5C, if the onboarding times of the inexperienced developer and the experienced developer are relatively similar for the particular software component, then it may be determined that skills from other software components have negligible effect on onboarding time for the second software component. Graph 500D of FIG. 5D illustrates comparison of a time per unit of contribution 509 corresponding to an experienced developer to a time per unit of contribution 510 corresponding to an inexperienced developer for a third software component. As shown in FIG. 5D, if the experienced developer has a relatively high onboarding time for the third software component as compared to the inexperienced developer, then it may be determined that skills from other software components may negatively impact mastery of the third software component.

Assignments of developers to work on particular software components may be determined based on the onboarding times as are illustrated by graphs 500B-D of FIGS. 5B-D. For example, in some embodiments, an experienced developer that is in an advanced tier for another software component may be assigned to the first software component based on the onboarding time for the first software component that is illustrated by graph 500B of FIG. 5B, due to the relatively easy transferability of skills from other software components to the first software component that is indicated by graph 500B of FIG. 5B. In some embodiments, an inexperienced developer may be assigned to the second software component based on the onboarding time for the second software component that is illustrated by graph 500C of FIG. 5C, as the onboarding time for the second software component is relatively unaffected by experience with other software components. In some embodiments, an inexperienced developer may be assigned to the third software component based on the onboarding time for the third software component that is illustrated by graph 500D of FIG. 5D, due to the relatively difficult transferability of skills from other software components to the third software component as indicated by graph 500D of 5D.

Graphs 500A-D of FIGS. 5A-D are shown for illustrative purposes only. For example, a time spent per unit of development may have any appropriate value over time. Further, developer tiers may have any appropriate thresholds. In some embodiments, any of times per unit of contribution 504-510 may correspond to individual developers; in other embodiments, any of times per unit of contribution 504-510 may be average values for multiple developers having relatively similar experience levels. In some embodiments, a number of defects detected per unit of contribution may be analyzed and tracked over time as for experienced and inexperienced developers, and used to divide developers into tiers such as tiers 503A-C, as illustrated by graphs 500A-D. An advanced developer may be identified based on detection of a lower number of defects per unit of contribution to a software component (or per unit of contribution written using a specific skill), and a beginner developer may be identified based on detection of a higher number of defects per unit of contribution to the software component (or per unit of contribution written using a specific skill). In some embodiments, developer tiers may be determined for specific skills (e.g., programming techniques or languages) across multiple software components rather than for a single software component. For example, an amount of time or number of defects per code contribution for a specific programming language may be tracked and analyzed over time, as illustrated by graphs 500A-D, for developers in an organization, in order to identify advanced developers for the programming language in the organization.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method to improve committed code, the method comprising:

responsive to the committed code comprising a number of errors or defects for a first software component associated with a first developer, determining, by a software management component management system executed on a computer, a size and an amount of time corresponding to the committed code, the software component management system retrieving the first software component from a software component code base;

determining, by the computer, a time per unit of contribution based on the size and amount of time;

updating, by the computer, component mastery metrics corresponding to the first software component in an expertise score vector corresponding to the first developer based on the time per unit of contribution;

retrieving, by the computer, a problem record for the software component;

performing, using natural language processing (NLP) on the computer, analysis of the problem record to output keywords that are identified in the problem record;

generating, by the computer, a work item for the software component using the keywords previously identified using NLP, such that the work item is placed in a work item queue on the computer;

assigning, by the computer, the first developer to a developer tier based on the component mastery metrics;

assigning, by the computer, the work item corresponding to the first software component to the first developer based on the developer tier;

determining, by the computer, a first average time per unit of contribution for a first plurality of developers on a first team corresponding to the first software component;

comparing, by the computer, the first average time per unit of contribution to a second average time per unit of contribution for a second plurality of developers on a second team corresponding to a second software component;

determining, by the computer, a component complexity of the first software component based on the comparison; and assigning, by the computer, a new developer to the first team for the first software component based on the component complexity and an associated expertise score vector, thereby improving errors or defects associated with the committed code; and updating, by the computer, the associated expertise score vector according to work having been performed by the new developer.

2. The computer-implemented method of claim 1, comprising:

determining a first amount of time for the first developer to achieve an advanced developer tier for the first software component based on first component mastery metrics corresponding to the first developer;

determining a second amount of time for a second developer to achieve the advanced developer tier for the first software component based on second component mastery metrics corresponding to the second developer, wherein the second developer is associated with a second software component that is not associated with the first developer; and comparing the first amount of time to the second amount of time.

3. The computer-implemented method of claim 2, comprising, based on determining that the first amount of time is greater than the second amount of time, assigning an experienced developer to a team corresponding to the first software component.

4. The computer-implemented method of claim 2, comprising, based on determining that the first amount of time is less than the second amount of time, assigning an inexperienced developer a team corresponding to the first software component.

5. The computer-implemented method of claim 2, comprising, based on determining that the first amount of time is equal to the second amount of time, assigning an inexperienced developer to a team corresponding to the first software component.

6. A system to improve committed code, the system comprising:

a memory having computer readable instructions; and one or more processors for executing the computer readable instructions, the computer readable instructions controlling the one or more processors to perform operations comprising:

responsive to the committed code comprising a number of errors or defects for a first software component associated with a first developer, determining, by a software management component management system executed on the one or more processors, a size and an amount of time corresponding to the committed code contributed, the software component management system retrieving the first software component from a software component code base;

determining a time per unit of contribution based on the size and amount of time;

updating component mastery metrics corresponding to the first software component in an expertise score vector corresponding to the first developer based on the time per unit of contribution;

retrieving, by the one or more processors, a problem record for the software component;

performing, using natural language processing (NLP) on the one or more processors, analysis of the problem record to output keywords that are identified in the problem record;

generating, by the one or more processors, a work item for the software component using the keywords previously identified using NLP, such that the work item is placed in a work item queue on the computer;

assigning the first developer to a developer tier based on the component mastery metrics;

assigning the work item corresponding to the first software component to the first developer based on the developer tier;

determining a first average time per unit of contribution for a first plurality of developers on a first team corresponding to the first software component;

comparing, by the one or more processors, the first average time per unit of contribution to a second average time per unit of contribution for a second plurality of developers on a second team corresponding to a second software component;

determining, by the one or more processors, a component complexity of the first software component based on the comparison;

assigning, by the one or more processors, a new developer to the first team for the first software component based on the component complexity and an associated expertise score vector, thereby improving errors or defects associated with the committed code; and updating, by the one or more processors, the associated expertise score vector according to work having been performed by the new developer.

7. The system of claim 6, comprising:

determining a first amount of time for the first developer to achieve an advanced developer tier for the first software component based on first component mastery metrics corresponding to the first developer;

determining a second amount of time for a second developer to achieve the advanced developer tier for the first software component based on a second component mastery metrics corresponding to the second developer, wherein the second developer is associated with a second software component that is not associated with the first developer; and comparing the first amount of time to the second amount of time.

8. The system of claim 7, comprising, based on determining that the first amount of time is greater than the second amount of time, assigning an experienced developer to a team corresponding to the first software component.

9. The system of claim 7, comprising, based on determining that the first amount of time is less than the second amount of time, assigning an inexperienced developer a team corresponding to the first software component.

10. The system of claim 7, comprising, based on determining that the first amount of time is equal to the second amount of time, assigning an inexperienced developer to a team corresponding to the first software component.

11. A computer program product comprising a computer readable storage medium having program instructions embodied therewith to improve committed code, the program instructions executable by a processor to cause the processor to perform operations comprising:

responsive to the committed code comprising a number of errors or defects for a first software component associated with a first developer, determining, by a software management component management system executed on the processor, a size and an amount of time corresponding to the committed code contributed, the software component management system retrieving the first software component from a software component code base;

determining a time per unit of contribution based on the size and amount of time;

updating component mastery metrics corresponding to the first software component in an expertise score vector corresponding to the first developer based on the time per unit of contribution;

retrieving, by the processor, a problem record for the software component;

performing, using natural language processing (NLP) on the processor, analysis of the problem record to output keywords that are identified in the problem record;

generating, by the processor, a work item for the software component using the keywords previously identified using NLP, such that the work item is placed in a work item queue on the computer;

assigning the first developer to a developer tier based on the component mastery metrics;

assigning, by the processor, a work item corresponding to the first software component to the first developer based on the developer tier;

determining a first average time per unit of contribution for a first plurality of developers on a first team corresponding to the first software component;

comparing the first average time per unit of contribution to a second average time per unit of contribution for a second plurality of developers on a second team corresponding to a second software component;

determining a component complexity of the first software component based on the comparison;

assigning, by the processor, a new developer to the first team for the first software component based on the component complexity and an associated expertise score vector, thereby improving errors or defects associated with the committed code; and updating, by the processor, the associated expertise score vector according to work having been performed by the new developer.

12. The computer program product of claim 11, comprising:

determining a first amount of time for the first developer to achieve an advanced developer tier for the first software component based on first component mastery metrics corresponding to the first developer;

determining a second amount of time for a second developer to achieve the advanced developer tier for the first software component based on second component mastery metrics corresponding to the second developer, wherein the second developer is associated with a second software component that is not associated with the first developer; and comparing the first amount of time to the second amount of time.

13. The computer program product of claim 12, comprising, based on determining that the first amount of time is greater than the second amount of time, assigning an experienced developer to a team corresponding to the first software component.

14. The computer program product of claim 12, comprising, based on determining that the first amount of time is less than the second amount of time, assigning an inexperienced developer a team corresponding to the first software component.

* * * * *